United States Patent
Yamada

(10) Patent No.: US 8,037,718 B2
(45) Date of Patent: Oct. 18, 2011

(54) METHOD FOR MANUFACTURING OPTICAL FIBER PREFORM

(75) Inventor: Naritoshi Yamada, Sakura (JP)

(73) Assignee: Fujikura Ltd., Tokyo (JP)

( * ) Notice: Subject to any disclaimer, the term of this patent is extended or adjusted under 35 U.S.C. 154(b) by 311 days.

(21) Appl. No.: 12/370,131

(22) Filed: Feb. 12, 2009

(65) Prior Publication Data

US 2010/0050696 A1    Mar. 4, 2010

(30) Foreign Application Priority Data

Sep. 3, 2008    (JP) ................. 2008-225817

(51) Int. Cl.
*C03B 37/018*    (2006.01)
*C03B 37/10*    (2006.01)

(52) U.S. Cl. ............................ 65/421; 65/414; 65/427

(58) Field of Classification Search ............ 65/413–416, 65/421, 422, 423, 424, 426, 427, 507, 529, 65/531

See application file for complete search history.

(56) References Cited

U.S. PATENT DOCUMENTS

| | | | | |
|---|---|---|---|---|
| 6,467,311 B1 * | 10/2002 | Fujii et al. | ......... | 65/385 |
| 2002/0194879 A1 * | 12/2002 | Takei et al. | ......... | 65/413 |
| 2004/0118164 A1 * | 6/2004 | Boek et al. | ......... | 65/398 |
| 2007/0283722 A1 * | 12/2007 | Pathak et al. | ......... | 65/500 |

FOREIGN PATENT DOCUMENTS

| | | | |
|---|---|---|---|
| EP | 0401742 A1 | | 12/1990 |
| JP | 07-223833 A | | 8/1995 |
| JP | 08-310828 | * | 11/1996 |
| JP | 08-310828 A | | 11/1996 |
| JP | 2000-109333 A | | 4/2000 |
| JP | 2003-081657 A | | 3/2003 |
| RU | 2243944 C2 | | 8/2004 |
| WO | 2008/093352 A2 | | 8/2008 |

OTHER PUBLICATIONS

Bansal, Handbook of Glass Properties, 1986, Elsevier, p. 13.*

* cited by examiner

*Primary Examiner* — Matthew Daniels
*Assistant Examiner* — Lisa Herring
(74) *Attorney, Agent, or Firm* — Sughrue Mion, PLLC

(57) ABSTRACT

Method for manufacturing an optical fiber perform, which forms a glass fine particle deposition portion composed of glass fine particles on a glass rod, and suspends the glass fine particle deposition vertically into a heating furnace to heat, and transparentize, the glass fine particle deposition. The method comprises the following steps: forming a hazy portion before heating, by causing a surface portion of the glass rod to sublime and adhere to at least a portion of a region closer to one end of the glass rod than a region of the glass rod where the deposition portion is formed; forming the deposition portion by depositing the glass fine particles on the glass rod; and transparentizing the deposition portion by heating the glass fine particle deposition in a state where the proximal end of the glass rod where the hazy portion is formed is suspended vertically into the heating furnace.

7 Claims, 9 Drawing Sheets

METHOD FOR MANUFACTURING OPTICAL FIBER PREFORM

BACKGROUND OF THE INVENTION

Priority is claimed on Japanese Patent Application No. 2008-225817, filed Sep. 3, 2008, the content of which is incorporated herein by reference.

1. Field of the Invention

The present invention relates to a method for manufacturing an optical fiber preform by an OVD method, a VAD method, etc.

2. Description of Related Art

Methods, such as an OVD (Outside Vapor Deposition) method, a VAD (Vapor Phase Axial Deposition) method, an MCVD (Modified CVD) method, and a plasma method, are used for manufacturing an optical fiber preform.

Especially, the VAD method and the OVD method are well known as methods capable of realizing production of large size preform and high-speed deposition. In these methods, an optical fiber preform is obtained by forming a porous deposition portion, composed of glass fine particles, on a glass rod with tetrachlorosilane ($SiCl_4$) or the like as a raw material to form a glass fine particle deposition and by transparentizing the deposition portion by heating.

The optical fiber preform is elongated to a predetermined diameter if necessary, and is obtained as a preform for an optical fiber, and this preform is heated and drawn and is obtained as an optical fiber.

In recent years, in order to reduce the manufacturing cost of an optical fiber, the diameter or length of the optical fiber preform is increased, that is, enlargement of the optical fiber preform is requested. However, if the optical fiber preform is enlarged, the following problems occur easily.

FIGS. 11 and 12 are views schematically showing an example of a heating furnace which heats a glass fine particle deposition.

A heating furnace 70 (hereinafter called "gradient furnace") shown in FIG. 11 includes a muffle tube 71, a holding member 72 which is movable up and down, and a heating source 73 provided in a position equivalent to a portion of the glass fine particle deposition 4 in its length. The glass fine particle deposition 4 held by the holding member 72 is heated sequentially in the length direction by the heating source 73.

A heating furnace 80 (hereinafter called "soaking furnace") shown in FIG. 12 includes a muffle tube 81, a holding member 82, and a heating source 83 capable of heating the glass fine particle deposition 4 over its total length.

The glass fine particle deposition 4 is brought into a state where an end of the glass rod 1 is held by the holding member 72 or 82, and the glass fine particle deposition is suspended into the heating furnace 70 or 80. The deposition portion 3 is heated to, for example, 1500 to 1600° C. by the heating source 73 or 83, and is transparentized.

In this transparentizing step, in order to utilize even the upper end of the deposition portion 3 as an effective portion without waste, it is necessary to sufficiently heat even this upper end.

However, when the upper end of the deposition portion 3 is heated, the glass rod 1 is also heated, and is softened. Thus, there is a possibility that deformation, such as elongation, may occur. Particularly, since the large-scale glass fine particle deposition 4 also has heavy weight, deformation of the glass rod 1 occurs easily.

In addition, the amount of heat required for transparentizing of the deposition portion 3 becomes larger as the diameter of the deposition portion 3 is large. Therefore, it is necessary to arrange the deposition portion 3 with large diameter in a high-temperature region within the heating furnace 70 or 80 or to lengthen heating time. For this reason, the amount of heat which the glass rod 1 receives also increases, and consequently, the above problem, such as deformation, also occurs easily. Since the glass rod 1 in which deformation has occurred cannot be reused, this result in a cost increases.

In order to prevent any deformation of the glass rod 1, the glass fine particle deposition 4 may be arranged in a position where the glass rod 1 does not become unduly high temperature, within the heating furnace 70 or 80. However, in this case, heating of the upper end of the deposition portion 3 may become insufficient, and this portion may not become an effective portion.

That is, with enlargement of the optical fiber preform, it was difficult to transparentize the deposition portion to its upper end, and to prevent any deformation of the glass rod.

The following method is known as the method for manufacturing an optical fiber preform.

In Japanese Unexamined Patent Application, First Publication No. 2003-81657, a method of adjusting the vitrification temperature, traveling speed, supply gas flow rate, etc. of an optical fiber preform according to the position of a vitrified portion of a porosity soot body, thereby preventing an optical fiber preform from falling from a supporting rod is suggested.

However, even in this method, it was difficult to make "transparentizing the porosity soot body to its upper end" and "prevention of any deformation of the supporting rod" compatible with each other as the optical fiber preform is made large. Additionally, there was also a problem in that it was difficult to cope with any variation in preform size.

In Japanese Unexamined Patent Application, First Publication No. H07-223833, a method of preventing a temperature rise in a rod which supports a soot deposition by a temperature rise preventing means, such as a reflecting plate or a heat shielding plate, is disclosed.

However, since a temperature rise preventing means is provided in this method, the structure of a heating furnace becomes complicated. Moreover, since an expensive temperature rise preventing means made of heat-resistant materials, such as porous ceramics, is required, cost may become high.

In Japanese Unexamined Patent Application, First Publication No. H08-310828, a manufacturing method using a preform holding portion including a central portion made of transparent quartz glass and an outer layer portion made of opaque quartz glass is suggested. In this method, the amount of transmission of infrared light was suppressed by the outer layer portion, and any deformation of the preform holding portion could be prevented. However, it was difficult to solve a problem of deformation of the rod.

SUMMARY OF THE INVENTION

The invention has been made in view of the above circumstances, and an object thereof is to provide a method for manufacturing an optical fiber preform by transparentizing a deposition portion of glass fine particles, capable of transparentizing a whole deposition portion, preventing any deformation of a glass rod, and suppressing manufacturing cost.

The invention has adopted the followings in order to solve the above problems and to achieve the relevant object.

(1) A method for manufacturing an optical fiber preform of the invention is a method for manufacturing an optical fiber preform, which forms a deposition portion composed of glass fine particles on a glass rod so as to form a glass fine particle deposition, and suspends the glass fine particle deposition vertically into a heating furnace to heat the glass fine particle deposition to transparentize the deposition portion, the method comprising: a step of forming a hazy portion, by causing a surface portion of the glass rod to sublime and adhere to at least a portion of a region closer to one end of the glass rod than a region of the glass rod where the deposition portion is formed, before said heating; a step of forming the deposition portion by depositing the glass fine particles on the glass rod; and a step of transparentizing the deposition portion by heating the glass fine particle deposition in a state where the proximal end of the glass rod where the hazy portion is formed is held and the glass fine particle deposition is suspended vertically into the heating furnace.

According to the method for manufacturing an optical fiber preform described in (1), the hazy portion is formed in the surface of the glass rod. Thus, when heating is performed using the heating furnace, reflection or scattering of energy beams, such as infrared light, etc. occurs, and a temperature rise inside the glass rod is suppressed. For this reason, deformation of the glass rod can be prevented.

Accordingly, even when a large-sized optical fiber preform is manufactured, the whole deposition portion including the upper end can be sufficiently heated in the heating furnace, and the whole deposition portion is transparentized, and can be an effective portion. Consequently, this is advantageous in terms of manufacturing cost.

Additionally, since deformation, such as elongation of the glass rod, can be prevented, manufacture conditions are not changed in the course of the transparentizing step, but transparentization of the deposition portion can be performed reliably. Consequently, a reliable optical fiber preform is obtained.

Additionally, since a heat shielding plate or the like for prevention of a temperature rise is unnecessary, cost can be suppressed in this respect.

Additionally, since any deformation of the glass rod does not occur, the glass rod can also be reused.

(2) Preferably, the step of forming the hazy portion is performed prior to the step of forming the deposition portion.

(3) Preferably, the step of forming the hazy portion is performed by a deposition apparatus used for the step of forming the deposition portion.

(4) Preferably, the step of forming the hazy portion is performed before the glass rod is introduced into a deposition apparatus used for the step of forming the deposition portion.

(5) Preferably, the step of forming the hazy portion is performed by the step of forming the deposition portion by a series of operation of a burner.

(6) Preferably, the step of forming the hazy portion is performed by using a burner for deposition used for the step of forming the deposition portion.

(7) Preferably, the burner is a deposition burner used for the formation of the deposition portion.

The glass rod serves as a target on which glass fine particles are deposited, and is made of silica glass or the like. For example, the glass rod is a core member which is used in the OVD method, a starting rod which is used in a VAD method, or the like. The glass rod may include a rod body equivalent to an effective portion, and supporting rods (dummy rods) which are welded on both ends of this rod body in order to support the rod body.

The above core member may have both of a portion used as a core of an optical fiber and a portion used as cladding, and may include only a portion used as a core of an optical fiber.

The method of depositing glass fine particles is not particularly limited, and may be a method of supplying a source gas to deposit glass fine particles in a flame, or a method of depositing glass fine particles by plasma.

The glass fine particles may be glass fine particles including silica as a main component, and may include an additive agent which adjusts the refractive index and viscosity of core or clad of an optical fiber, for example, Ge, F, Cl, P, B, etc.

The heating furnace is not particularly limited to those which can heat the deposition portion to transparentize the portion. For example, the heating furnace may be a gradient furnace which moves the glass fine particle deposition and a heating source relative to each other, or a soaking furnace having a heating source which covers the total length of the glass fine particle deposition.

The hazy portion to be formed on the glass rod may be formed adjacent to the deposition portion, and may be formed in a position distant from the deposition portion. Additionally, the hazy portion may be formed in a portion of a region closer to one end than a region where the deposition portion is formed, and may be formed in all this region.

DETAILED DESCRIPTION OF THE INVENTION

A method for manufacturing an optical fiber preform of the present invention will be described with reference to the drawings.

First Embodiment

Figure 1:
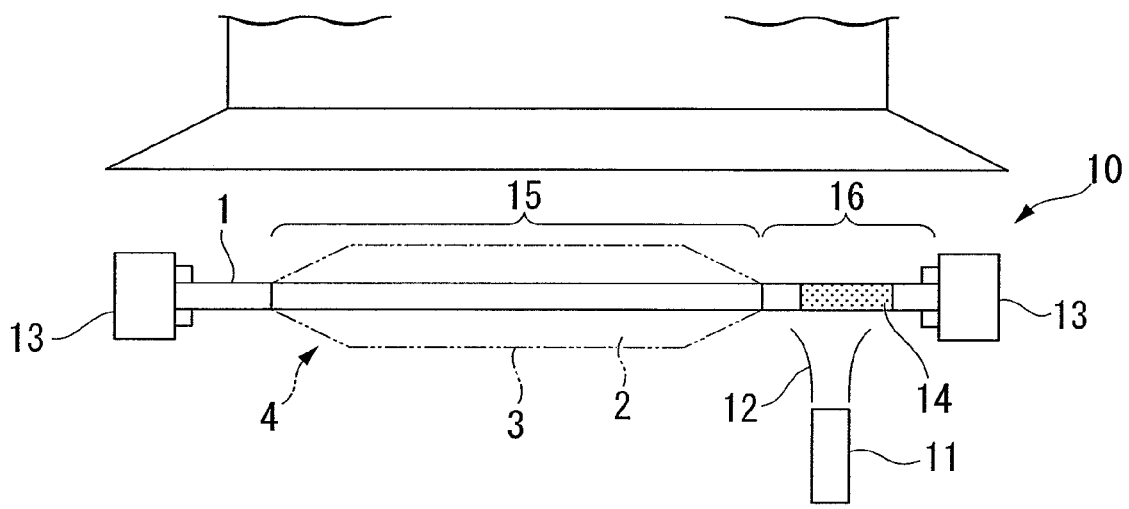
FIG. 1 is a schematic diagram showing an OVD deposition apparatus which can be used for a method for manufacturing an optical fiber preform related to the invention.

FIG. 1 shows an OVD deposition apparatus 10 including a burner 11 for deposition. Preferably, the burner 11 for deposition is movable in a longitudinal direction of a glass rod 1, and applies an oxyhydrogen flame 12 to a desired position.

By holding the glass rod 1 by supporting portions 13 while being rotated around an axis, the OVD deposition apparatus 10 is configured such that the oxyhydrogen flame 12 is uniformly applied to the whole peripheral surface of the glass rod 1.

By supplying an oxygen gas and a hydrogen gas to the burner 11 for deposition, applying the oxyhydrogen flame 12 to the glass rod 1, and flame-polishing the surface of the glass rod 1, flaws or foreign materials on the glass rod 1 are removed with heat.

In the burner 11 for deposition, a hazy portion 14 is formed in a portion of the transparent glass rod 1 by suitably setting the amount of the oxygen gas and hydrogen gas to be supplied and adjusting the conditions of the oxyhydrogen flame 12.

The hazy portion 14 is formed as the material of a surface portion of the glass rod 1 sublimes and readheres. Specifically, the hazy portion 14 can be formed, for example, as follows.

When the temperature of the surface of the glass rod 1 exceeds about 1800° C., a portion of the surface ($SiO_2$) of the glass rod 1 will sublime as silicon oxide (SiO). The sublimed silicon oxide is bonded with the oxygen or moisture in the atmosphere, and adheres to the surface of the glass rod 1 again as glass fine particles composed of silicon dioxide ($SiO_2$). The hazy portion 14 is formed by this.

The amount of sublimation of silicon oxide increases as temperature becomes higher, and becomes significant if the temperature exceeds 2000° C.

It is known that the sublimation of silicon oxide progresses rapidly in a reducing atmosphere. On the contrary, the sublimation is suppressed in an oxidizing atmosphere. For this reason, the amount of sublimation and the amount of glass fine particles which readheres can be adjusted by adjusting the atmosphere.

The above readhesion occurs markedly in a peripheral region of a high-temperature region (for example, around 2000° C.) where the sublimation progresses, specifically, in a low-temperature region of around 1500° C. If the high-temperature region where the sublimation proceeds, and the low-temperature region where the readhesion occurs are close to each other and the temperature change from the high-temperature region to the low-temperature region is spatially rapid, then the above glass fine particles readhere before they are separated and scattered from the surface of the glass rod. Therefore, the amount of adhesion of the glass fine particles increases. For example, if a burner which can supply an inert gas or the like from an outer peripheral edge of the oxyhydrogen frame 12 is used, the above low-temperature region can be easily formed by this inert gas or the like.

Although an oxyhydrogen flame, flames by other combustion gases, a plasma flame, a heater, a laser, etc. can be used as a means which heats the surface of the glass rod 1, it is preferable to use, particularly, the oxyhydrogen flame to be used in an optical fiber manufacturing step. The oxyhydrogen flame can easily form the atmosphere in an oxidizing atmosphere or reducing atmosphere by adjusting the flow ratio of oxygen and hydrogen.

Even when combustion gases other than oxygen and hydrogen are used, the oxidizing atmosphere or reducing atmosphere can be formed by using an oxidizing gas or a reducing gas together.

Although a required degree of hazing of the hazy portion 14 changes depending on the size of a glass fine particle deposition 4 and the amount of infrared lights in a heating furnace or the like, a desired hazy portion 14 can be formed by setting heating temperature, heating time, atmosphere, etc.

For example, when the oxyhydrogen flame 12 is used, a desired hazy portion 14 can be formed by suitably setting the amounts of oxygen gas and hydrogen gas, their flow ratio, the traveling speed of the burner 11 for deposition, etc.

The expression "the hazy portion 14 is formed" means a phenomenon that the above glass fine particles readheres on the surface of the glass rod 1, and this surface becomes opaque.

For example, when an oxyhydrogen burner is used as the burner 11 for deposition, the size of glass fine particles which readheres is 0.1 µm to several micrometers. In this case, welding by heat does not nearly progress between the adhering fine particles, and the fine particles are not brought into a completely integrated state. Therefore, the readhering portion becomes opaque. This state is naturally occurred since the temperature of the readhering portion is low compared with the portion where the sublimation occurs.

Since fine particles deposit while maintaining a certain degree of shape, that is, in a state where there is a gap therebetween, not only infrared light but visible light is also scattered. Thus, the readhering portion is visually recognized as an opaque white layer, i.e., haziness.

For this reason, the degree of haziness can be approximately grasped according to the degree of opacity thereof. For example, when the degree of opacity is expressed by the optical transmittance of visible light, it is suitable in the invention that the optical transmittance of visible light is 25% or less, and preferably 5% or less.

In a state where there is a little haziness, for example, in a case where the optical transmittance of visible light is greater than 25%, the scattering effect of infrared light is also a little, and the effect of preventing any deformation of the glass rod 1 is reduced.

If the amount of readhesion of glass fine particles is increased, the scattering effect of infrared light also increases, but if the glass fine particles are deposited thickly, peeling and so on also occurs easily. Therefore, it is preferable to set the thickness of the deposited glass fine particles up to about 1 mm.

The above optical transmittance can be measured on the basis of a method specified in ISO 9050. If the method is described roughly, the optical transmittance is a ratio of transmitted light flux to incident light flux about the light flux of the daylight which enters a glass surface of a sample piece perpendicularly, and is obtained by determining the relative luminosity of light adaptation with standard daylight D65 defined in CIE (Commission International d'Eclairage) as a light source. The range of a wavelength to be used for measurement is 380 nm to 780 nm.

The formation position of the hazy portion 14 is set in at least a portion of a region 16 (hereinafter referred to the non-formation region 16) at one end of the glass rod 1 (right in FIG. 1) rather than a region 15 (hereinafter referred to as the formation region 15) where the deposition portion 3 which will be described below is formed. This non-formation region 16 is a portion (non-deposition portion) in which the glass fine particles 2 are not deposited, but the deposition portion 3 is not formed.

The hazy portion 14 may be formed only in the non-formation region 16 from the beginning, or a method of forming hazy portions in both the non-formation region 16 and the formation region 15, and removing the hazy portion of the formation region 15 by so-called haze removal of reheating the hazy portion with a frame having weakened heating power may be taken.

The formation position of the hazy portion 14 is easily defined by positioning of the burner 11 for deposition. For this reason, in a transparentizing step which will be described below, the hazy portion 14 can be formed in a position which is likely to become high temperature, for example, in a position near a boundary between the formation region 15 and the non-formation region 16.

It is often effective that the hazy portion 14 is formed within a range of a predetermined distance on the side of an end from the boundary between the formation region 15 and the non-formation region 16. However, when the upper end of the deposition portion 3 interrupts a portion of radiant heat from heating sources 73 and 83 in the heating furnace 70 and 80, it may be effective to form the hazy portion 14 in a position distant from the above boundary. Additionally, the hazy portion 14 may be formed in the whole non-formation region 16.

As the method of forming the hazy portion 14, other methods, for example, sandblasting or the like is also considered. However, as described above, the hazy portion 14 can be formed without damaging the glass rod 1 by the method of making a glass material sublime and readhere to form a hazy portion. Therefore, it is advantageous in that there is no concern about crack generation, and the strength reduction of the glass rod 1 does not occur.

Although there is also a glass rod made of foamy silica glass as the glass rod having the hazy portion, the glass rod 1 made of transparent silica glass is higher strength. Therefore, it is more preferable to form the hazy portion 14 in the transparent glass rod 1.

When the hazy portion 14 is formed by sublimation and readhesion of a glass material, since the hazy portion 14 is made of glass fine particles, the hazy portion 14 does not deteriorate by a dehydrating agent, when a dehydration step which will be described below is performed. Additionally, a heating furnace is not contaminated.

The hazy portion 14 formed by sublimation and readhesion can be removed by flame polishing or the like. Therefore, when the hazy portion 14 becomes unnecessary, such as when the glass rod 1 is reused, the hazy portion 14 can be removed easily. In order to carry out readhesion of the material of the glass rod 1 to form the hazy portion 14, incorporation of impurities is hardly caused compared with a case where other materials are made to adhere, thereby forming a hazy portion.

In the formation region 15, a glass source gas is supplied to the burner 11 for deposition, and the glass fine particles 2 are created. Specifically, for example, the glass fine particles 2 made of silica ($SiO_2$) are created, as $SiCl_4$ that is a glass source gas performs a hydrolysis reaction and an oxidization reaction (mainly hydrolysis reaction) in a flame.

The glass fine particle deposition 4 is obtained by depositing the glass fine particles 2 on a portion of the peripheral surface of the glass rod 1 and forming the porous deposition portion 3. In forming the deposition portion 3, the method of depositing the glass fine particles 2 by plasma may be used.

When the deposition portion 3 is formed, the hazy portion 14 in the non-formation region 16 is made to remain. In order to make the hazy portion 14 remain, it is effective not to apply the oxyhydrogen flame 12 to the non-formation region 16, or to adjust the heating power of the oxyhydrogen flame 12 in the non-formation region 16 to such an extent that the hazy portion 14 remain.

Figure 7:
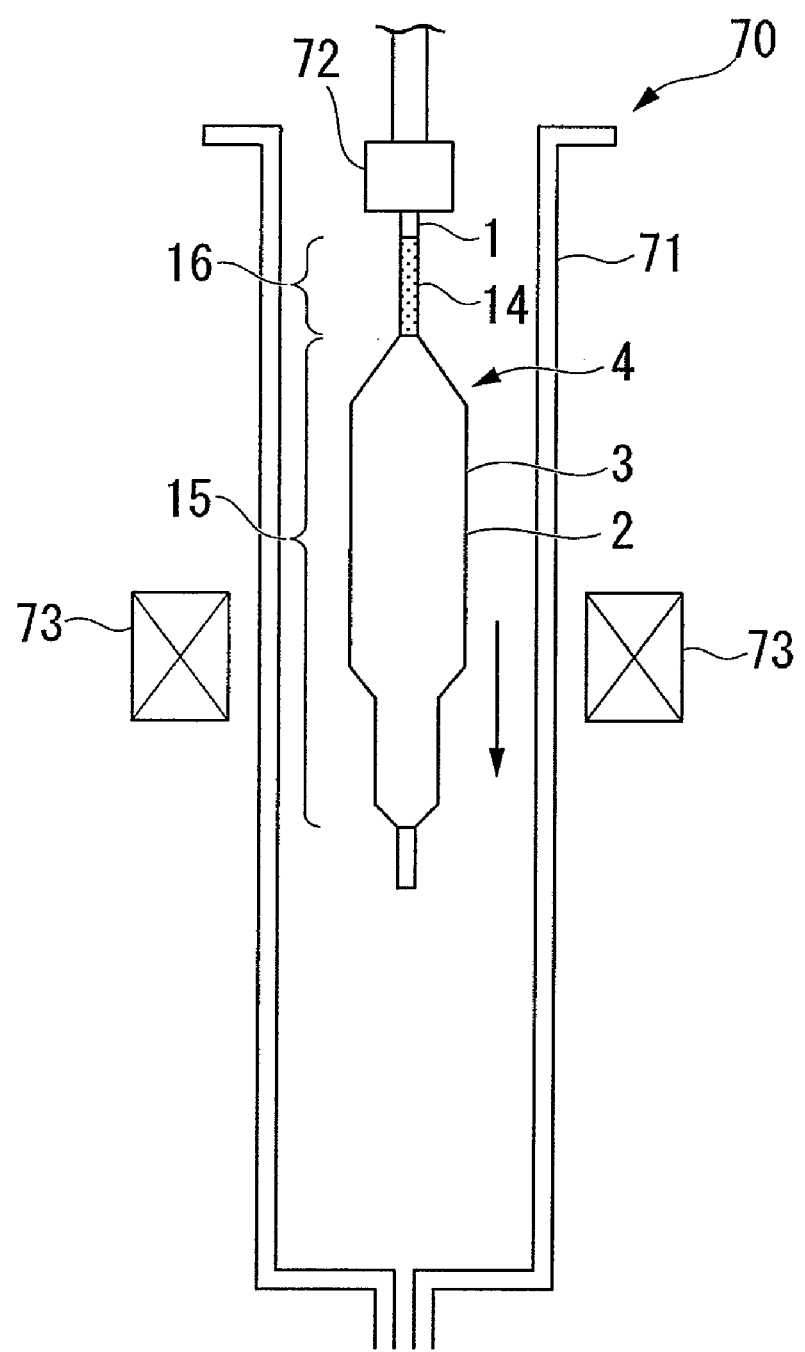
FIG. 7 is a schematic diagram showing a heating furnace which can be used for the method for manufacturing an optical fiber preform related to the invention.

FIG. 7 is a view schematically showing an example of the heating furnace which heats the glass fine particle deposition 4. The heating furnace 70 (gradient furnace) includes a muffle tube 71, a holding member 72 which is movable up and down, and a heating source 73 provided in a position equivalent to a portion of the glass fine particle deposition 4 in its length portion.

As shown in FIG. 7, the glass fine particle deposition 4 is heated sequentially in a length direction by the heating source 73 while being lowered, in a state where an upper end (an end extending from the deposition portion 3) of the glass rod 1 is held by the holding member 72, and the glass fine particle deposition 4 is suspended vertically into the heating furnace 70.

The proximal end of the glass rod 1 where the hazy portion 14 is formed is held by the holding member 72. Thereby, at least a portion of the hazy portion 14 is located below this holding position. In the illustrated example, the upper end of the glass rod 1 is held by the holding member 72, and the hazy portion 14 is located below the holding member 72.

The deposition portion 3 is heated to, for example, 1500 to 1600° C. by the heating source 73, and is transparentized.

Thereby, the glass fine particle deposition 4 becomes an optical fiber preform. This step is called transparentizing step.

Additionally, a dehydration step can also be performed using a dehydrating agent including chlorine or the like before the transparentizing step.

When the deposition portion 3 is heated, the non-formation region 16 of the glass rod 1 is also heated by infrared light or the like. However, since the hazy portion 14 is formed in the surface of the non-formation region 16, reflection or scattering of energy beams, such as infrared light, occurs in this hazy portion 14, and a temperature rise inside the glass rod 1 is suppressed. For this reason, deformation of the glass rod 1 can be prevented.

Accordingly, even when a large-sized optical fiber preform in which the length or diameter of the deposition portion 3 is large is manufactured, the whole deposition portion 3 including the upper end can be sufficiently heated in the heating furnace 70, and the whole deposition portion 3 is transparentized, and can be an effective portion. Consequently, this is advantageous in terms of manufacturing cost.

Additionally, since deformation, such as elongation of the glass rod 1, can be prevented, manufacture conditions are not changed in the course of the transparentizing step, but transparentization of the deposition portion 3 can be performed reliably. Consequently, a reliable optical fiber preform is obtained.

Additionally, since a heat shielding plate or the like for prevention of a temperature rise is unnecessary, cost can be suppressed in this respect.

Additionally, since any deformation of the glass rod 1 does not occur, the glass rod 1 can also be reused.

Generally, in the manufacture of an optical fiber preform, the haze of a glass surface should be removed since it invites the strength reduction of an optical fiber, and the haze has been removed by the processing called a haze removal step.

In contrast, in the invention, the effect that a large-sized optical fiber preform can be manufactured is exhibited by daring to leave the hazy portion 14. Since the hazy portion 14 is formed in the non-formation region 16 of the glass rod 1 that is a non-effective portion, there is no concern about the strength reduction of an optical fiber.

Since the hazy portion 14 is formed before the step of forming the deposition portion 3 in the above method, formation of the hazy portion 14 can be repeated.

For example, when a predetermined hazy portion 14 is not obtained under conventional conditions according to a size change or the like in the glass rod 1, formation of the hazy portion 14 can be performed again under different conditions. Consequently, an optimal hazy portion 14 can be formed.

Additionally, formation of the hazy portion 14 can be performed by the OVD deposition apparatus 10 which can form the deposition portion 3. Therefore, the position which becomes the boundary between the formation region 15 and the non-formation region 16 (non-deposition portion) can be grasped correctly, and the formation position of the hazy portion 14 can be determined with precision.

Additionally, the formation of the hazy portion 14 can be performed by the burner 11 for deposition to be used for formation of the deposition portion 3. Therefore, an exclusive configuration for the formation of the hazy portion 14 is unnecessary, and the configuration of an apparatus may be simplified, or an OVD apparatus with a burner only for flame polishing may be used without any particular limitation.

Figure 8:
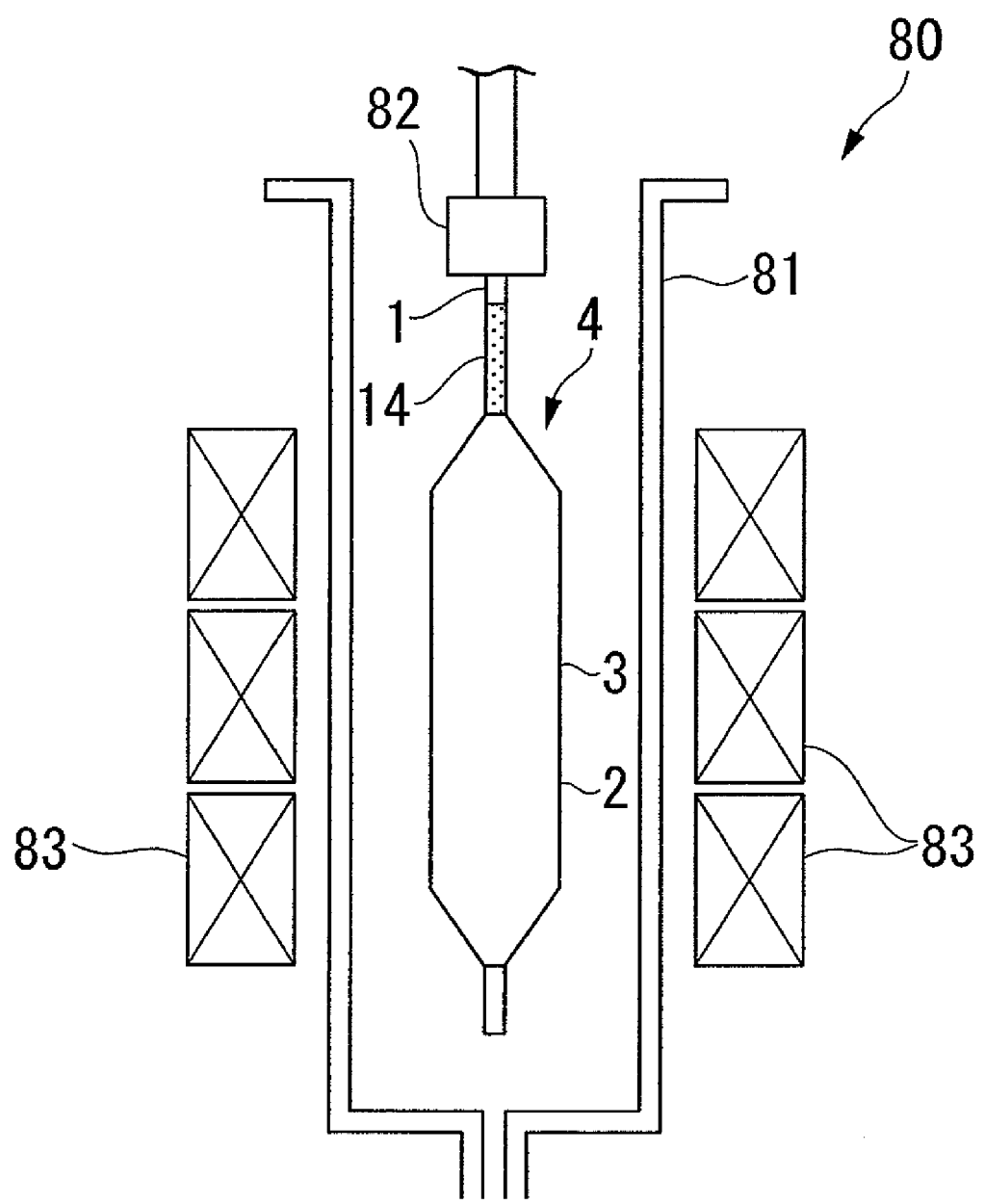
FIG. 8 is a schematic diagram showing the heating furnace which can be used for the method for manufacturing an optical fiber preform related to the invention.

The above transparentizing step is not limited to the heating furnace 70 (gradient furnace) shown in FIG. 7 but can be performed in the heating furnace 80 shown in FIG. 8. A heating furnace 80 (soaking furnace) includes a muffle tube 81, a holding member 82, and a heating source 83 capable of heating the deposition portion 3 over its total length.

As shown in FIG. 8, the whole deposition portion 3 is heated by the heating source 83 in a state where an upper end of the glass rod 1 is held by the holding member 82, and the glass fine particle deposition 4 is suspended vertically into the heating furnace 80. The deposition portion 3 is transparentized by heating, and the glass fine particle deposition 4 becomes an optical fiber preform.

During heating, reflection or scattering of energy beams, such as infrared light, occur in the hazy portion 14, and a temperature rise inside the glass rod 1 is suppressed. For this reason, deformation of the glass rod 1 can be prevented.

Second Embodiment

Next, how to use a VAD apparatus 30 including a burner 18 for a core and a burner 18 for cladding will be described.

In the following description, the same reference numerals will be given to already-appeared components, and the description thereof will be omitted.

Figure 2:
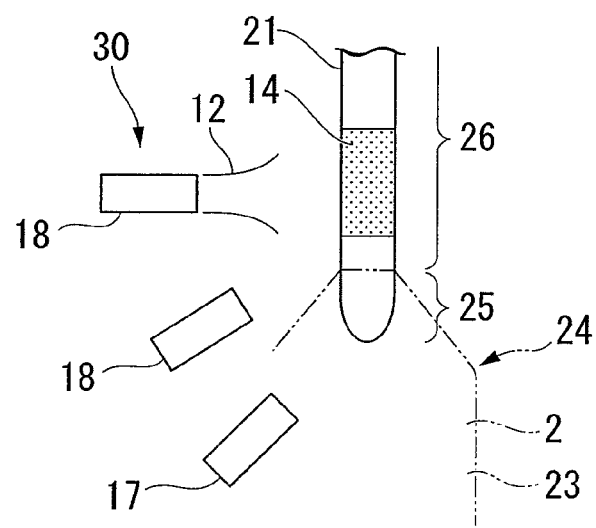
FIG. 2 is a schematic diagram showing a VAD apparatus which can be used for the method for manufacturing an optical fiber preform related to the invention.

As shown in FIG. 2, before a deposition portion 23 is formed in a starting rod 21 (glass rod), an oxyhydrogen flame 12 is applied to the starting rod 21 by the burner 17 for a core or the burner 18 for cladding, thereby forming the hazy portion 14. Multiple burners 18 may be used for cladding.

The hazy portion 14 is formed in some or all of a non-formation region 26 which will be described below.

After the formation of the hazy portion 14, the glass fine particles 2 are deposited on a formation region 25 including the lower end of the starting rod 21 by the burner 17 for a core and the burner 18 for cladding, thereby forming a deposition portion 23 to obtain a glass fine particle deposition 24. In FIG. 2, a region closer to an upper end than the formation region 25 becomes a region 26 (non-formation region 26) where the deposition portion 23 is not formed.

Figure 9:
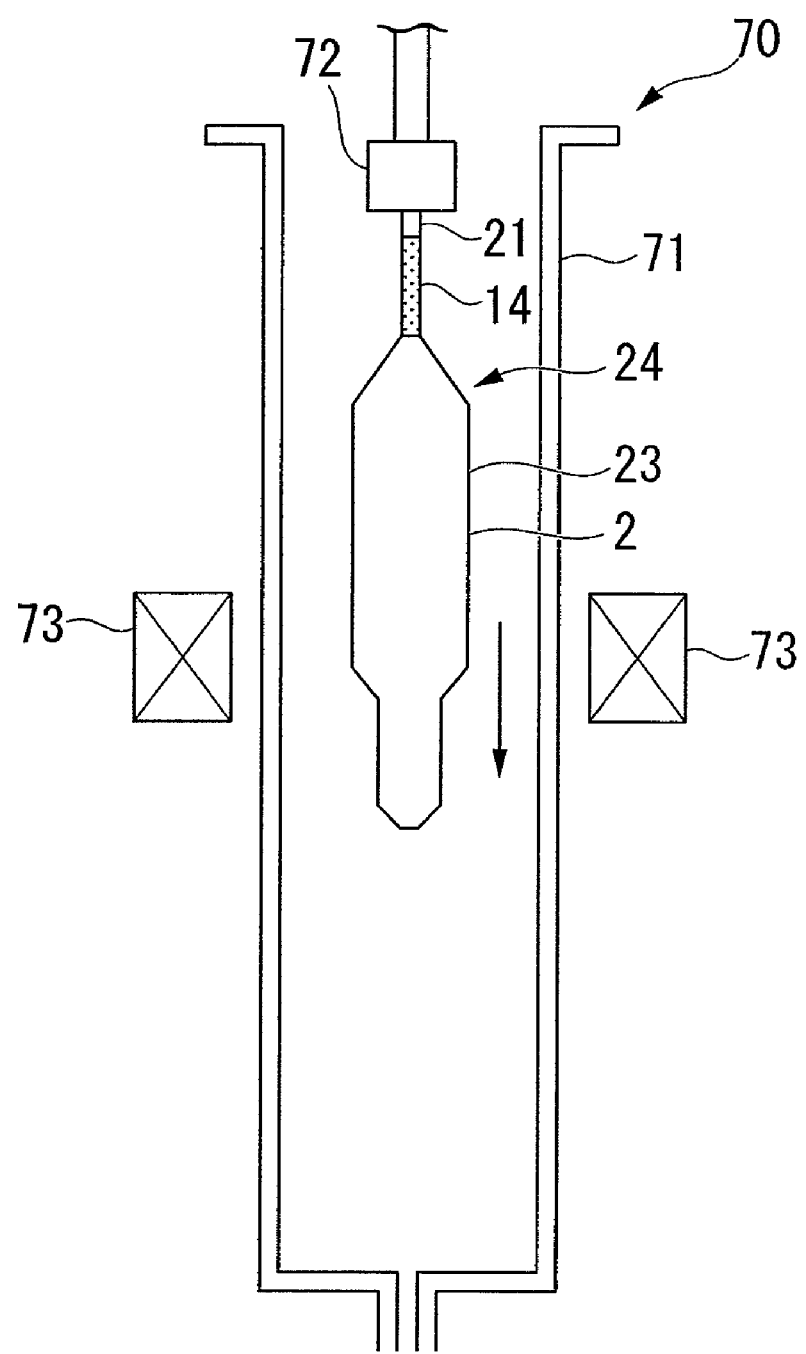
FIG. 9 is a schematic diagram showing the heating furnace which can be used for the method for manufacturing an optical fiber preform related to the invention.

When the heating furnace 70 shown in FIG. 9 is used, the glass fine particle deposition 24 is heated sequentially in a length direction by the heating source 73 while being lowered, in a state where an upper end (an end extending from the deposition portion 23) of the starting rod 21 is held by the holding member 72, and the glass fine particle deposition 24 is suspended vertically into the heating furnace 70. The proximal end of the starting rod 21 where the hazy portion 14 is formed is held, and at least a portion of the hazy portion 14 is located below this holding position. In the illustrated example, the upper end of the starting rod 21 is held by the holding member 72, and the hazy portion 14 is located below the holding member 72.

The deposition portion 23 is transparentized by heating, and the glass fine particle deposition 24 becomes an optical fiber preform.

During heating, reflection or scattering of energy beams, such as infrared light, occur in the hazy portion 14, and a temperature rise inside the starting rod 21 is suppressed. For this reason, deformation of the starting rod 21 can be prevented.

Figure 10:
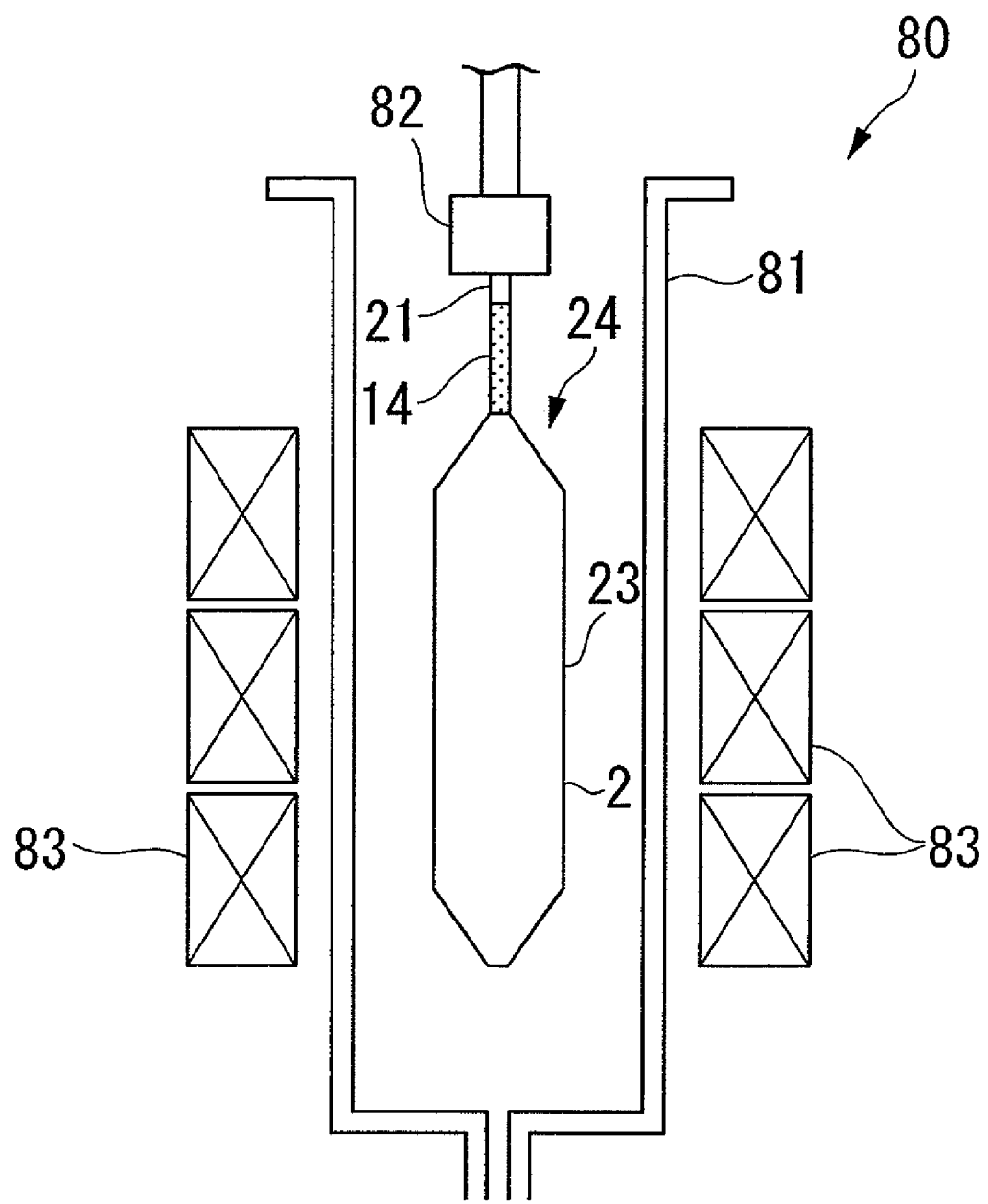
FIG. 10 is a schematic diagram showing the heating furnace which can be used for the method for manufacturing an optical fiber preform related to the invention.
Figure 11:
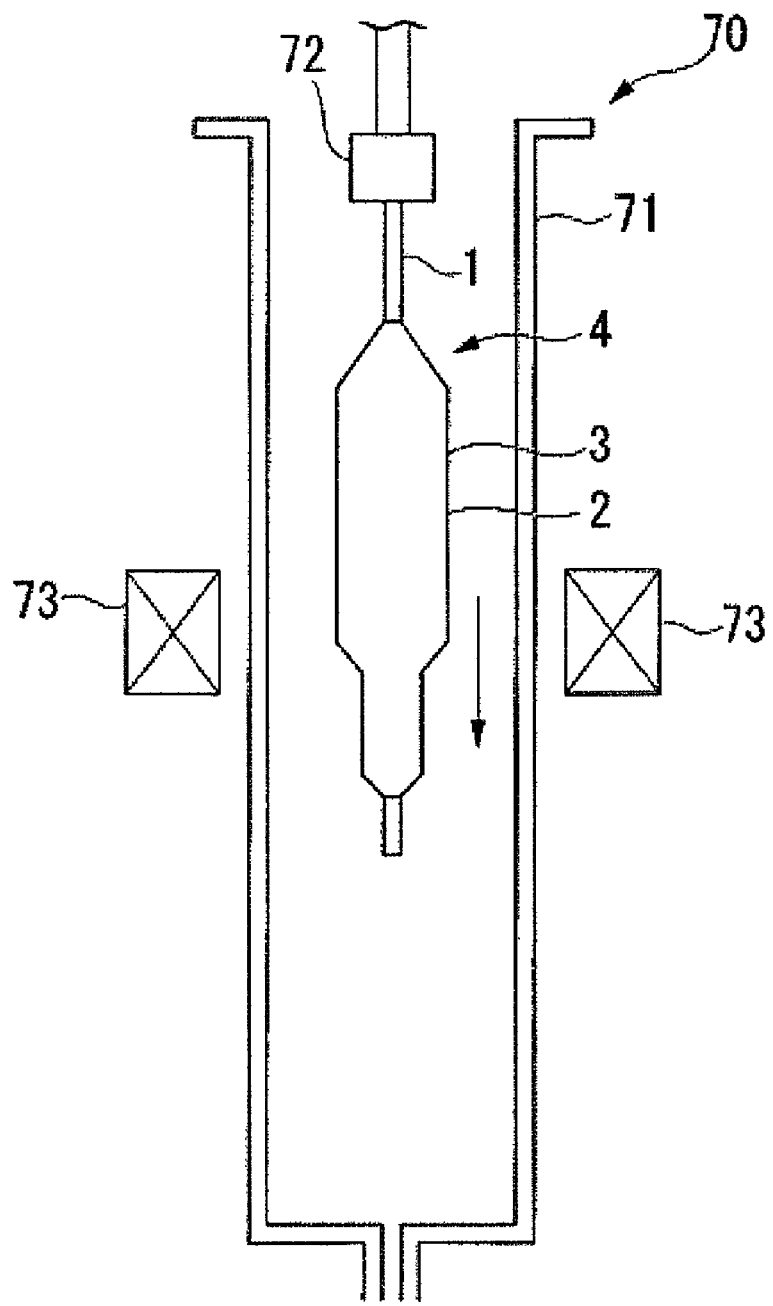
FIG. 11 is a schematic diagram showing a heating furnace which can be used for a conventional method for manufacturing an optical fiber preform.
Figure 12:
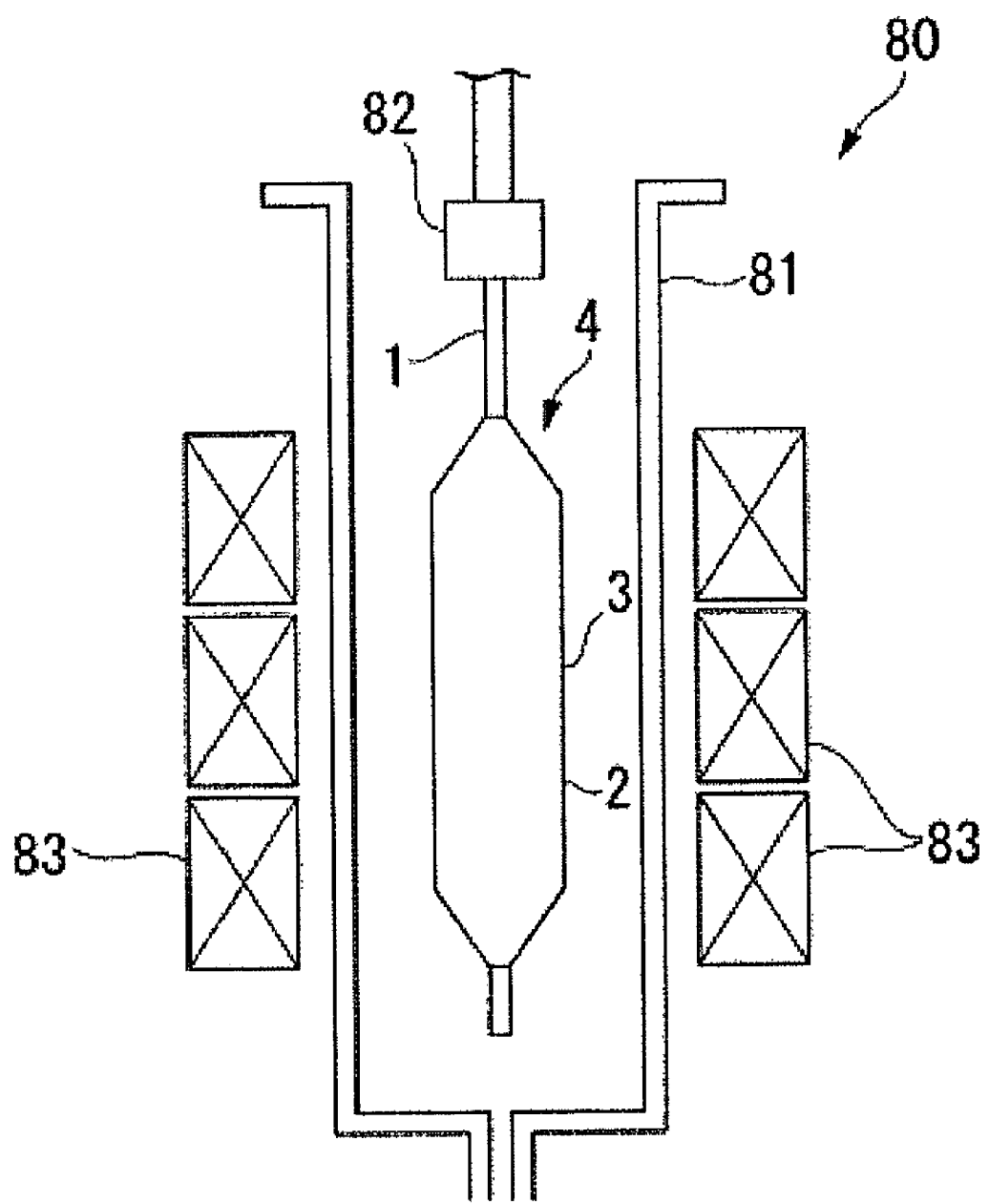
FIG. 12 is a schematic diagram showing the heating furnace which can be used for a conventional method for manufacturing an optical fiber preform.

When the heating furnace 80 shown in FIG. 10 is used, the whole deposition portion 23 is heated and transparentized by the heating source 83 in a state where an upper end of the starting rod 21 is held by the holding member 82, and the glass fine particle deposition 24 is suspended vertically into the heating furnace 80.

During heating, reflection or scattering of energy beams, such as infrared light, occur in the hazy portion 14, and a temperature rise inside the starting rod 21 is suppressed. For this reason, deformation of the starting rod 21 can be prevented.

Even in the second embodiment, similarly to the method of the first embodiment, even when a large-sized optical fiber preform is manufactured, the whole deposition portion 23 is transparentized and can be an effective portion. Additionally, this is advantageous in terms of manufacturing cost.

Third Embodiment

Figure 3:
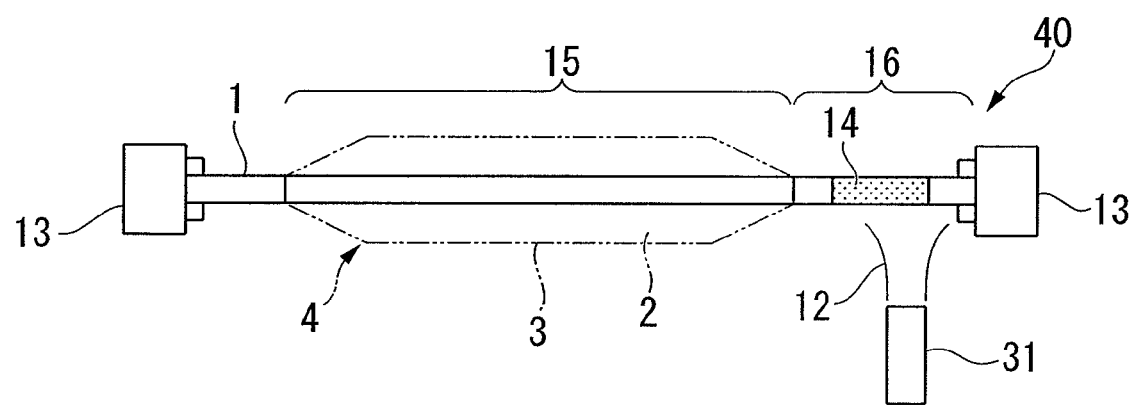
FIG. 3 is a schematic diagram showing a glass working lathe which can be used for the method for manufacturing an optical fiber preform related to the invention.

As shown in FIG. 3, the hazy portion 14 can also be formed using a glass working lathe 40 including a burner 31 for working.

Working is performed using the glass working lathe 40 if necessary, thereby obtaining the glass rod 1. For example, a glass supporting rod is welded on a glass core member by using the burner 31 for working, thereby obtaining the glass rod 1.

Next, the hazy portion 14 is formed in a portion of the non-formation region 16 by the oxyhydrogen flame 12 by using the burner 31 for working.

Next, the deposition portion 3 is formed on the glass rod 1 according to the above-mentioned step by using the OVD deposition apparatus 10 shown in FIG. 1.

Next, the deposition portion 3 is heated and transparentized according to the above-mentioned step by using the heating furnace 70 shown in FIG. 7 or the heating furnace 80 shown in FIG. 8, thereby obtaining an optical fiber preform.

Even in this embodiment, even when a large-sized optical fiber preform is manufactured, the whole deposition portion 3 is transparentized and can be an effective portion. Additionally, this is advantageous in terms of manufacturing cost.

Additionally, since the hazy portion 14 is formed before the step of forming the deposition portion 3, formation of the hazy portion 14 is repeated. Thus, an optimal hazy portion 14 can be formed as described above.

Moreover, since the formation of the hazy portion 14 is performed before a glass rod is introduced into the OVD deposition apparatus 10, the hazy portion 14 is formed in advance on the glass rod 1 prior to the step of forming the deposition portion 3.

Consequently, the step of forming the hazy portion 14 can keep productivity high without affecting the efficiency of the step of forming the deposition portion 3.

Fourth Embodiment

Figure 4:
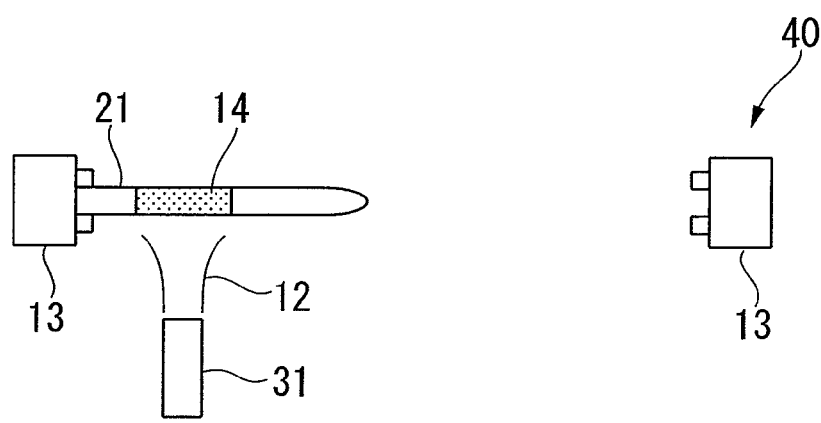
FIG. 4 is a schematic diagram showing the glass working lathe which can be used for the method for manufacturing an optical fiber preform related to the invention.

As shown in FIG. 4, when a VAD apparatus is used, the hazy portion 14 can be formed in the starting rod 21 (glass rod) by the burner 31 for working of the glass working lathe 40 prior to the formation of the deposition portion.

Fifth Embodiment

Figure 5:
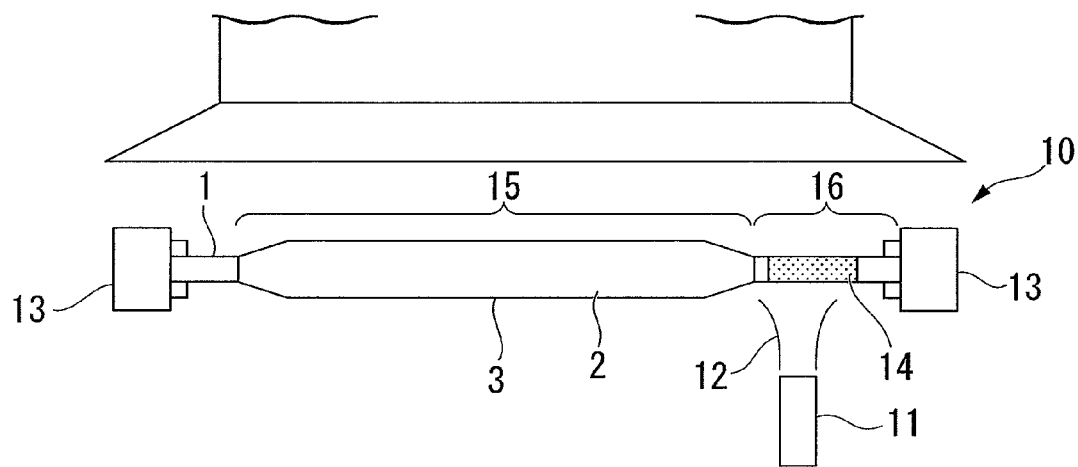
FIG. 5 is a schematic diagram showing the OVD deposition apparatus which can be used for the method for manufacturing an optical fiber preform related to the invention.

As shown in FIG. 5, the glass rod 1 is set in the OVD deposition apparatus 10.

While an oxygen gas, a hydrogen gas, and a glass source gas are supplied to the burner 11 for deposition, and the burner 11 for deposition is moved in an axial direction of the glass rod 1 with the oxyhydrogen flame 12 is applied to the glass rod 1, thereby forming the deposition portion 3 in the formation region 15.

When the oxyhydrogen flame 12 reaches the non-formation region 16, the supply of the glass source gas is stopped. In at least a portion of the non-formation region 16, the supply or the like of the oxygen gas and the hydrogen gas are set suitably so as to form the hazy portion 14. When the burner 11 for deposition reaches the formation region 15 again, the supply of the glass source gas is resumed, and the formation of the deposition portion 3 is advanced.

As such, the formation of the deposition portion 3 is advanced while attention is paid so that the hazy portion 14 may remain as the burner 11 for deposition is reciprocated in the length direction of the glass rod 1.

In order for the hazy portion 14 remain, it is effective not to apply the oxyhydrogen flame 12 to the non-formation region 16, or to adjust the heating power of the oxyhydrogen flame 12 in the non-formation region 16 to such an extent that the hazy portion 14 remains.

Even in this embodiment, when a large-sized optical fiber preform is manufactured, the whole deposition portion 3 is transparentized in the heating furnaces 70 and 80, and can be an effective portion. Additionally, this is advantageous in terms of manufacturing cost.

Moreover, since the deposition portion 3 and the hazy portion 14 can be formed by a series of operation of the burner 11 for deposition, the hazy portion 14 can be formed in an exact position, and production efficiency can be enhanced.

Additionally, since the hazy portion 14 is formed using the burner 11 for deposition used for the formation of the deposition portion 3, an exclusive configuration for the formation of the hazy portion 14 is unnecessary, and the configuration of an apparatus can be simplified.

Figure 6:
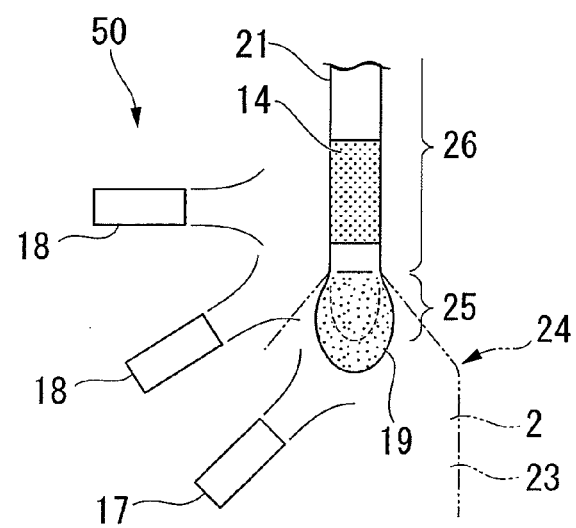
FIG. 6 is a schematic diagram showing the VAD apparatus which can be used for the method for manufacturing an optical fiber preform related to the invention.

As shown in FIG. 6, when the deposition portion 23 is formed using the VAD apparatus 50, the glass fine particles 2 is deposited on the formation region 25 of the starting rod 21 by the burner 17 for a core, thereby starting formation of core soot 19 which becomes a portion of the deposition portion 23. Thereafter, before the formation of cladding soot (not shown) is started, the hazy portion 14 is formed in the non-formation region 26 of the starting rod 21 by the burner 18 for cladding. Subsequently, the glass source gas is supplied to the burner 18 for cladding, thereby forming cladding soot (not shown). Multiple burners 18 may be used for cladding.

Although the invention will be more specifically described below by means of working examples, the invention is not limited to only the following working examples.

WORKING EXAMPLE 1

As shown in FIG. 2, the hazy portion 14 was formed by applying the oxyhydrogen flame 12 to the non-formation region 26 by the burner 18 for cladding for an outermost layer while the starting rod 21 with an external diameter of 28 mm was moved down at a traveling speed of 80 mm/min. The hazy portion 14 was formed over a length of 200 mm on the side of the upper end from the boundary between the formation region 25 and the non-formation region 26. When the hazy portion 14 was formed, the supply flow rate (200 liter/min) of the hydrogen gas to be supplied to the burner 18 for cladding was set to about 3.6 times to the supply flow rate (55 liter/min) of the oxygen gas.

Next, the deposition portion 23 was formed in the formation region 25 by the VAD method by using the burner 17 for a core and the burner 18 for cladding. Thereby, the glass fine particle deposition 24 having the deposition portion 23 with an external diameter of 300 mm and a length of 1500 mm was obtained.

Next, as shown in FIG. 9, the heating furnace 70 (gradient furnace) was used to hold the upper end of the starting rod 21 by the holding member 72, and suspend the glass fine particle deposition 24 vertically into the heating furnace 70, and to heat and dehydrate the glass fine particle deposition 24 at 1250° C. while being moved up and down at a traveling speed of 300 mm/h.

Next, the glass fine particle deposition 24 was heated and transparentized at 1500° C. while being lowered at a traveling speed of 180 mm/h within the heating furnace 70. At this time, the glass fine particle deposition 24 was lowered until the upper end of the deposition portion 23 arrived at a middle position of the heating source 73 in its height direction. Although the whole deposition portion 23 including the upper end was transparentized well, any deformation, such as elongation, was not observed in the starting rod 21.

When the same glass rod sample as the above starting rod 21 was prepared, and the hazy portion 14 was formed under the same conditions, the optical transmittance of the visible light of the hazy portion 14 was measured with reference to ISO 9050. As a result, the optical transmittance of visible light was 25%.

COMPARATIVE EXAMPLE 1

A glass fine particle deposition was manufactured in the same manner as Working Example 1 except that any hazy portion is not formed, and was heated under the same conditions as Working Example 1, thereby transparentizing a deposition portion.

As a result, it was confirmed that a portion of the starting rod is elongated by heating and its external diameter becomes 26 mm.

REFERENCE EXAMPLE 1

A glass fine particle deposition was manufactured in the same manner as Working Example 1 except that the length of a deposition portion is 2000 mm, and was heated under the same conditions as Working Example 1, thereby transparentizing the deposition portion.

As a result, it was confirmed that a portion of the starting rod is elongated by heating and its external diameter becomes 23 mm.

WORKING EXAMPLE 2

As shown in FIG. 2, the hazy portion 14 was formed by applying the oxyhydrogen flame 12 to the non-formation region 26 by the burner 18 for cladding for an outermost layer while the starting rod 21 with an external diameter of 28 mm was moved down at a traveling speed of 65 mm/min. The hazy portion 14 was formed over a length of 200 mm on the side of the upper end from the boundary between the formation region 25 and the non-formation region 26. When the hazy portion 14 was formed, the supply flow rate (280 liter/min) of the hydrogen gas to be supplied to the burner 18 for cladding was set to about 4.7 times to the supply flow rate (60 liter/min) of the oxygen gas. The transparentizing step was performed in a state where the other conditions are set to be the same as those of Reference Example 1.

Although the whole deposition portion 23 including the upper end was transparentized well, any deformation, such as elongation, was not observed in the starting rod 21.

When a sample of the same glass rod as the above starting rod 21 was prepared, and the hazy portion 14 was formed under the same conditions, the optical transmittance of the visible light of the hazy portion 14 was measured with reference to ISO 9050. As a result, the optical transmittance of visible light was 5%.

WORKING EXAMPLE 3

As shown in FIG. 3, the glass working lathe 40 was used to weld a glass supporting rod with an external diameter of 30 mm on both ends of a glass core member (rod body) with an external diameter of 30 mm by the burner 31 for working, thereby obtaining the glass rod 1 whose effective portion length is 1500 mm.

Next, the hazy portion 14 was formed in a portion of the non-formation region 16 of the glass rod 1 by the oxyhydrogen flame 12 by using the burner 31 for working. The hazy portion 14 was formed by supplying a hydrogen gas (at a supply flow rate of 300 liter/min), and an oxygen gas (at a supply flow rate of 60 liter/min) to the burner 31 for working while the burner 31 for working was traversed at a traveling speed of 65 mm/min. In a portion where the formation of a hazy portion is unnecessary, haze removal was performed by the burner 31 for working to remove a haze.

As shown in FIG. 1, the glass rod 1 was set in the OVD deposition apparatus 10, and the deposition portion 3 was formed in the formation region 15 such that the hazy portion 14 remains, thereby obtained the glass fine particle deposition 4 with an external diameter of 300 mm.

Next, the glass fine particle deposition 4 was heated at 1500° C. by using the heating furnace 80 (soaking furnace) shown in FIG. 8, thereby transparentizing the deposition portion 3. At this time, the glass fine particle deposition 4 was arranged such that the upper end of the deposition portion 3 becomes almost flush with an upper end position of the heating source 83.

Although the whole deposition portion 3 including the upper end was transparentized well, any deformation, such as elongation, was not observed in the glass rod 1.

COMPARATIVE EXAMPLE 2

A glass fine particle deposition was manufactured in the same manner as Working Example 3 except that any hazy portion is not formed, and was heated under the same conditions as Working Example 3, thereby transparentizing a deposition portion.

As a result, it was confirmed that a portion of the glass rod 1 is elongated by heating, and a lower end of the glass fine particle deposition of which the deposition portion is transparentized has arrived at a bottom of the heating furnace.

In the comparative examples, the reason why elongation occurred in the starting rod (glass rod) is because the temperature of the rod became high and the rod was softened. This temperature rise is based on, mainly, infrared light generated from a heating source of a heating furnace. Since the infrared light is transmitted through transparent glass, the infrared light reached even a deep portion in a transparent starting rod (glass rod), temperature rose, and viscosity was decreased, whereby the rod was softened.

In contrast, in the working embodiments, the hazy portion 14 is formed on the surface of the starting rod 21 (or glass rod 1). Therefore, the infrared light is reflected and scattered in the hazy portion. Therefore, the amount of the infrared light which reaches a deep portion could be reduced, and the temperature rise of the starting rod can be suppressed. For this reason, deformation was not occurred.

Accordingly, even when a large-sized optical fiber preform is manufactured, it was confirmed that the whole deposition portion can be transparentized.

Either even when the inclined sintering furnace is used or even when the soaking furnace is used, the problem of deformation of the glass rod may be caused. According to the invention, however, this problem can be solved by forming a hazy portion on the glass rod.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for manufacturing an optical fiber preform, which forms a deposition portion composed of glass fine particles on a glass rod so as to form a glass fine particle deposition, and suspends the glass fine particle deposition vertically into a heating furnace to heat the glass fine particle deposition to transparentize the deposition portion, the method comprising:
   a step of forming a hazy portion, by causing a surface portion of the glass rod to sublime and adhere to at least a portion of a region closer to one end of the glass rod than a region of the glass rod where the deposition portion is formed, before heating said glass fine particle deposition;
   a step of forming the deposition portion by depositing the glass fine particles on the glass rod; and
   a step of transparentizing the deposition portion by heating the glass fine particle deposition in a state where a proximal end of the glass rod where the hazy portion is formed is held and the glass fine particle deposition is suspended vertically into the heating furnace.

2. The method for manufacturing an optical fiber preform according to claim 1,
   wherein the step of forming the hazy portion is performed prior to the step of forming the deposition portion.

3. The method for manufacturing an optical fiber preform according to claim 2,
   wherein the step of forming the hazy portion is performed by a deposition apparatus used for the step of forming the deposition portion.

4. The method for manufacturing an optical fiber preform according to claim 3,
   wherein the step of forming the hazy portion is performed by using a burner for deposition used for the step of forming the deposition portion.

5. The method for manufacturing an optical fiber preform according to claim 2,
   wherein the step of forming the hazy portion is performed before the glass rod is introduced into a deposition apparatus used for the step of forming the deposition portion.

6. The method for manufacturing an optical fiber preform according to claim 1,
wherein the step of forming the hazy portion is performed by the step of forming the deposition portion by a series of operation of a burner.

7. The method for manufacturing an optical fiber preform according to claim 6,
wherein the burner is a deposition burner used for the formation of the deposition portion.

* * * * *